June 19, 1928.
D. EMERSON ET AL
1,673,816
ATTACHMENT FOR TRACTOR WHEELS
Filed June 7, 1926   3 Sheets-Sheet 1
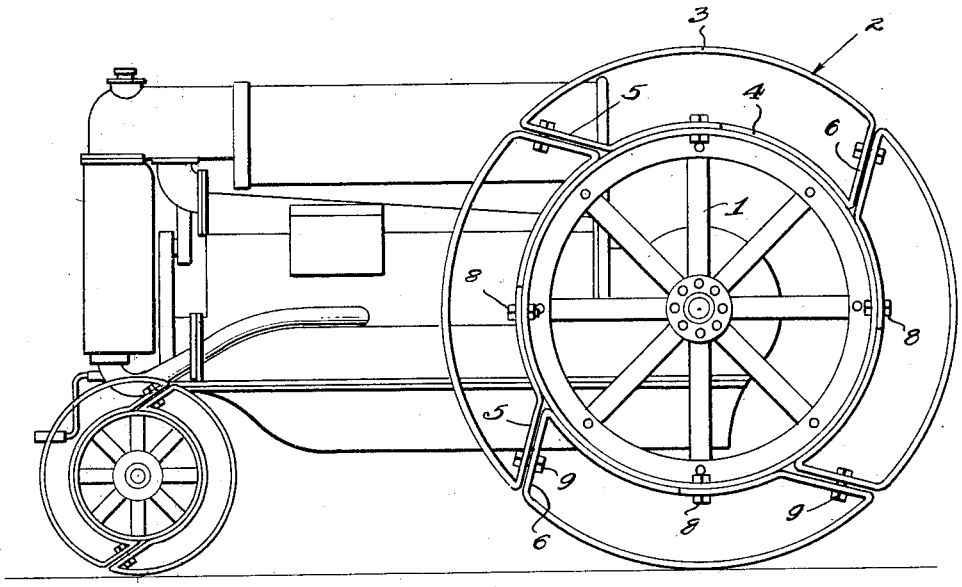
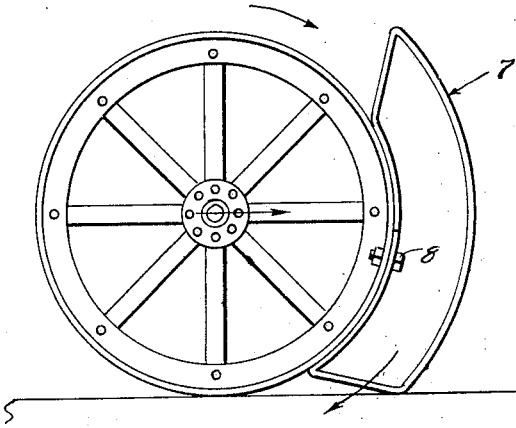
INVENTORS
Dean Emerson
James M. Keith
BY
ATTORNEY.

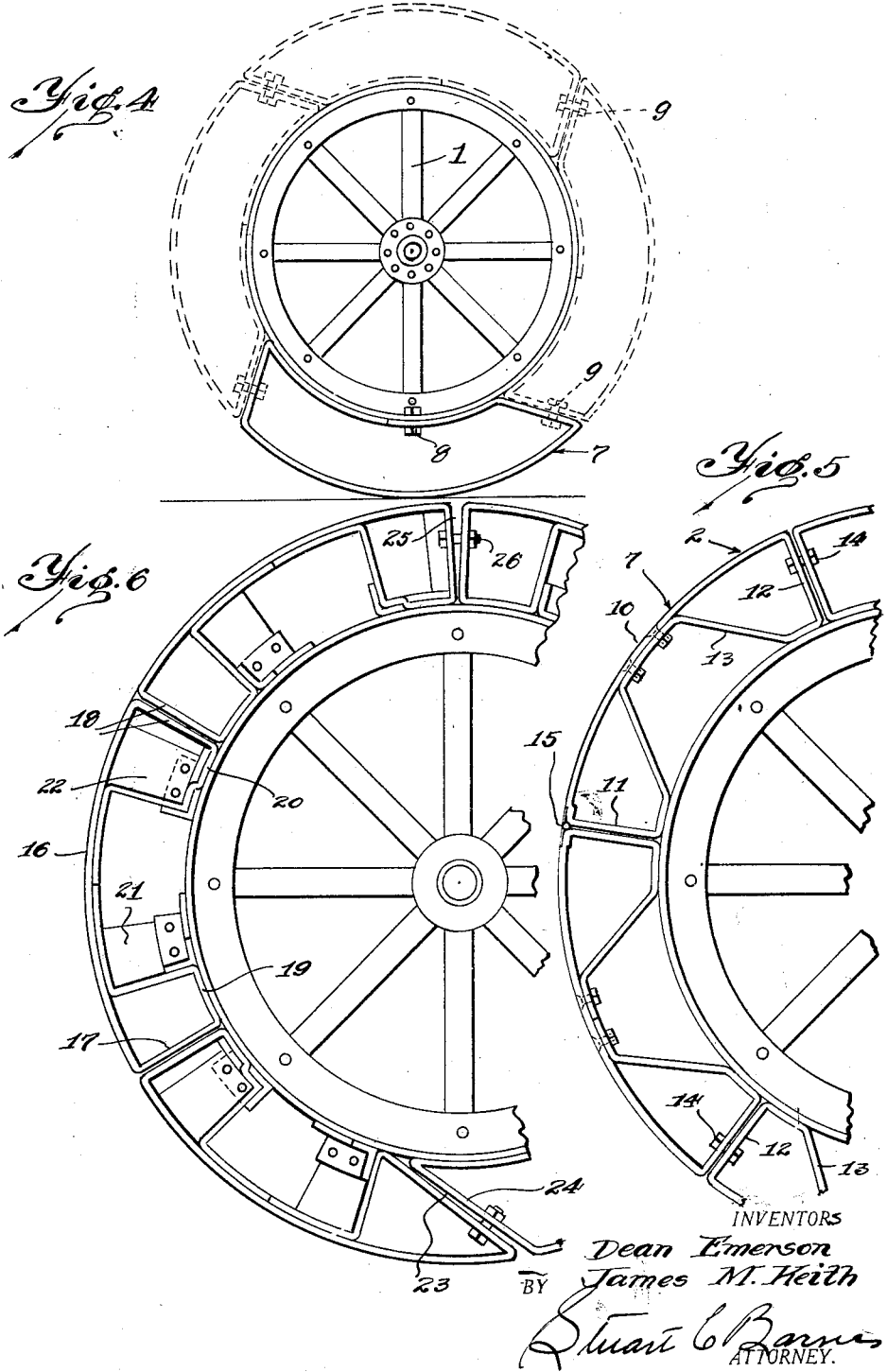

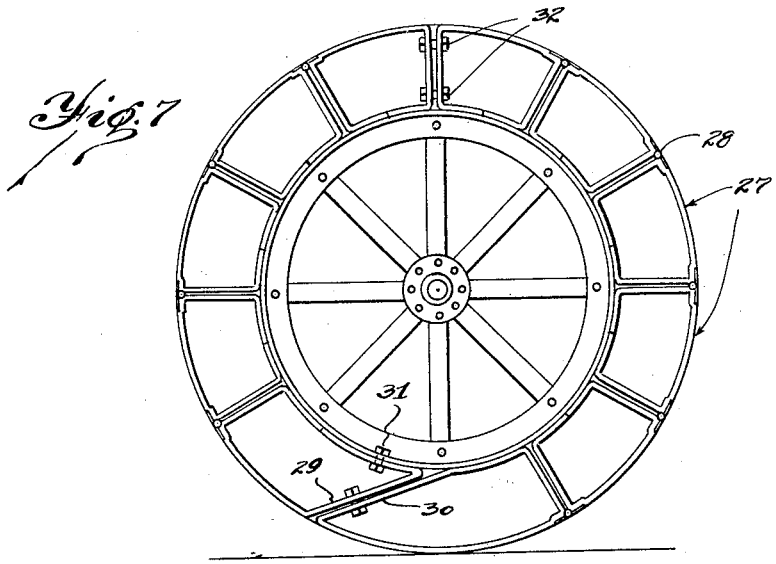
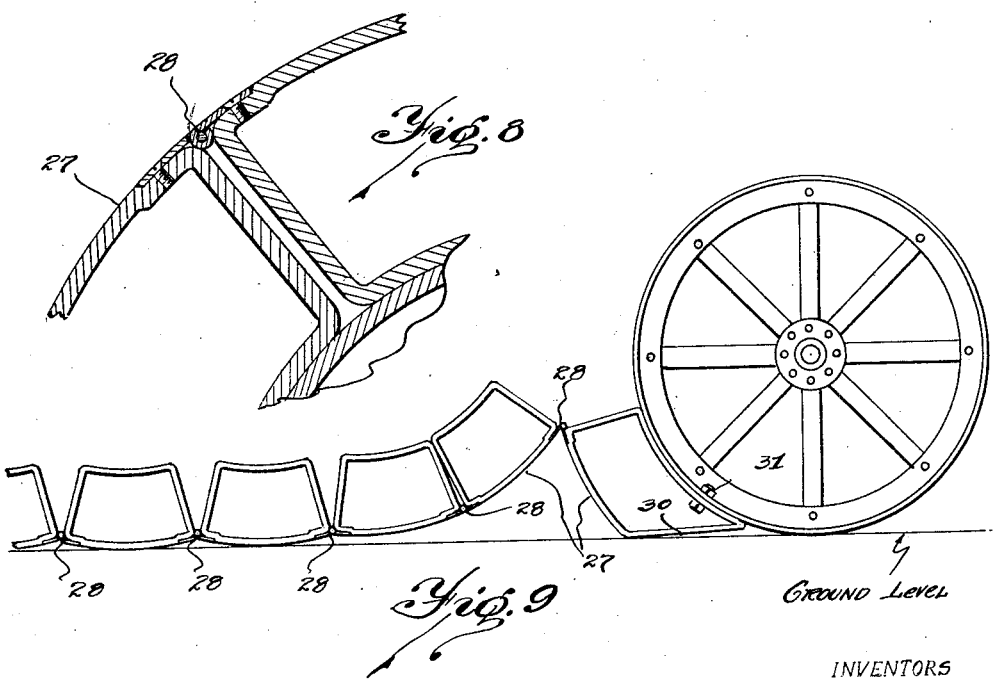

Patented June 19, 1928.

1,673,816

UNITED STATES PATENT OFFICE.

DEAN EMERSON AND JAMES M. KEITH, OF DETROIT, MICHIGAN.

ATTACHMENT FOR TRACTOR WHEELS.

Application filed June 7, 1926. Serial No. 114,105.

This invention relates to an attachment for tractors and has to do particularly with a simple, compact and quickly attachable and detachable unit applicable to the ordinary wheels of a tractor for increasing the diameter thereof.

Hitherto in the use of tractors for cultivating purposes, and for traveling over uneven ground, and in particular for the cultivating of corn, much difficulty has been incurred in raising the axles of the tractor to make such tractor applicable for cultivating purposes. Many devices have been designed for raising the tractor or for increasing the diameter of the wheels thereof, and some of these devices of the prior art have included means for adjustably positioning the axle relative to the wheel, or completely changing the wheels; and some have contemplated the securing of spokes and rim cleats to the rim of the tractor wheel. These devices of the prior art, while they have in a measure accomplished the purpose intended, have all presented the important objection of being either cumbersome, complicated or requiring a comparatively long time to assemble or disassemble, as well as requiring the jacking up of, or raising, of the tractor.

It is the object of the present invention to provide a simple, efficacious unit rim, or wheel, which may be directly applied to the standard tractor wheel without initially raising the tractor. More specifically, the present invention contemplates the provision of a unit tractor wheel which may be placed upon or secured to the standard tractor wheel in the same manner that a chain is applied to the ordinary automobile tire. The present invention also contemplates the provision of a separate wheel unit which is of such simple form that it may be secured to the standard tractor wheel by merely rolling the tractor wheel thereupon, or which separate wheel may be directly placed as a unit upon the tractor wheel when raised.

In the drawings:

Fig. 1 is a side elevation of a tractor showing the rear wheels provided with one form of our novel unit wheel structure.

Fig. 2 is a diagrammatic view illustrating the preferred method of securing the unit sections to the standard wheel of the tractor.

Fig. 3 is a vertical sectional view taken through the axis of the rear wheel and showing one method of securing the outer unit to the wheel and also showing the manner of reinforcing the outer unit.

Fig. 4 is a diagrammatic view illustrating the position of the tractor wheel after it has been rolled on the one unit segment and also illustrating the manner of securing the other segments thereto.

Fig. 5 is a fragmentary detail view of a modified form of unit segments forming the separate outer unit.

Fig. 6 is a fragmentary detail view illustrating a further modified form of unit wheel segments wherein the segments are adapted to fit in between the cleats on the tractor wheel.

Fig. 7 is a side elevation of a standard tractor wheel provided with our novel separate outer unit of the hinged type.

Fig. 8 is a detail fragmentary section illustrating the manner of hinging two of the unit segments together.

Fig. 9 is a diagrammatic side elevation illustrating the manner of securing the hinged outer unit to the standard tractor wheel, the initial segment being secured to the tractor wheel, and the other segments adapting themselves thereto by merely moving the tractor wheel forwardly over the hinged segments.

The preferred form of our unit tractor wheel for increasing the diameter of the standard tractor wheel is best illustrated in Figs. 1, 2, 3 and 4. It will be understood that this separate outer unit may be applied to either the front or rear wheels of any tractor as desired, and in Fig. 1 we have illustrated a tractor wheel 1 which has been raised to such a height as to permit cultivation of corn by the securing thereto of our separate outer wheel. This separate outer wheel may be generally designated 2, and in the form shown, is made up of arcuate complete units having an outer rim 3, an inner rim 4 adapted to cooperate with the circumferential surface of the tractor wheel, and connecting supports 5 and 6 for connecting the rims 3 and 4 for performing the complete unit. The ends of each unit, or the parts forming the supports are preferably formed at an angle, or tapered, as best shown in Fig. 2.

All of the arcuate segments, or units, may be tapered at each end, or only the cooperating ends of two units may be tapered, and the purpose of such tapering of the units is to permit the application of the outer unit to the standard wheel of the tractor without the necessity of raising the same from the ground. This method of securing the outer wheel to the inner wheel is diagrammatically illustrated in Figs. 2 and 4, and as shown in Fig. 2 the unit segment, which may be designated 7, is suitably secured to the rim of the tractor wheel by means of a bolt 8 and the tractor wheel is moved forwardly in the direction of the arrow, whereby the tractor wheel will readily move upon and be raised by the unit segment 7. The tractor wheel 1 being once positioned upon the unit segment 7, as illustrated in Fig. 4, it is obvious that it will be a comparatively simple matter to secure the remaining unit segments to the initial segment 7, and to each other by means of suitable connected bolts 9. It will be understood that the various unit segments are of such shape and form that when placed upon a particular tractor wheel a slight space will preferably present itself between each segment whereby the drawing together of the segments by means of the bolts 9 will securely clamp the segments upon the tractor wheel rim. It will further be understood that either the initial segment 7 or all the unit segments may be directly secured to the tractor rim by means of bolts 8, and that the unit segments 7 may be two or more in number.

A modification of the outer unit 2 and the complete units 7 making up the same is shown in Fig. 5. In this modification the outer rim which may be designated 10 and the supports 11 and 12 are substantially of the same construction as the individual units illustrated in Fig. 1, but the inner portion, which may be designated 13, is formed, whereby only a part thereof contacts with the rim of the tractor wheel, and the remainder of such inner portion is fabricated so as to form a brace or an additional support for supporting the outer rim 10. It will be obvious that the ends of these arcuate segments shown in Fig. 5, may be tapered similarly to the units illustrated in Fig. 1, and that such units may be connected together by means of the bolts 14 and hinged as at 15 to form two semi-circular units.

In Fig. 6 we have shown a further modification of the separate and complete units going to make up the complete outer wheel of the tractor. In this modification each of the separate unit comprises an outer rim 16 symmetrical with the periphery of the tractor rim and end members or spokes 17 and 18 which extend transversely and diagonally of the tractor wheel rim, and radially of the tractor wheel. The portion of this unit contacting with the surface of the tractor wheel rim comprises two parts, one of which may be designated 19, and which is designed to fit in between the diagonal cleats, and the other, which may be designated 20, is offset to conform with the angle portion of one of the tractor cleats. Both of these portions 19 and 20 of the segmental unit extend radially outward as at 21 and 22, and are then bent inwardly in conformity with the outer rim 16. The segmental unit formed by this structure is a very strong and compact unit providing strong reinforcement for the outer rim and also providing four supports, two of which cooperate with the standard cleats on the tractor rim. In this particular view illustrating this modification of our invention, we have shown only two of the units as having tapered faces, as at 23 and 24. The other arcuate segments may be directly connected to each other, and at a point diagrammatically opposite from the tapered faces 23 and 24, the ends of the two adjacent arcuate units preferably meet to form a V-shaped space 25. It will be obvious that by passing a suitable bolt through the ends of the units forming this V, as at 26, the various units may be drawn tightly against the tractor wheel rim and against the tractor cleats.

In the modification of our invention, as illustrated in Figs. 7, 8 and 9, the arcuate segments, which may be designated generally 27, are preferably hinged together at their outer adjacent ends, as at 28. Two of these hinged segmental units are preferably formed with tapered faces 29 and 30, and the unit whose face is formed with the tapered face 29 to form an acute angle is preferably initially secured to the tractor rim by means of a bolt and nut 31. The two arcuate units 27 which are positioned diametrically opposite the units having the adjacent tapered surfaces are preferably joined together by means of the adjustable bolts 32, whereby when the segmental hinged units or chains, are once positioned on the tractor wheel, the entire outer wheel may be joined together so as to tightly grip the tractor wheel by adjusting the nuts 32. The manner of applying this hinged outer tractor wheel to the standard tractor wheel will be obvious from an inspection of Fig. 9.

It will be understood that any number of bolts or other connections may be utilized in securing one or more of the unit segments to the surface of the tractor wheel, but it will be obvious that the unit tractor wheels, which we have shown in the various modifications, may be directly applied to the wheels of the tractor with the use of only one clamping means, or if desired, without the use of any clamping means such as a bolt and nut, as shown at 8, or 31. The separate outer unit formed by the one or more unit segments 7 or 21, is preferably narrower than the rim of the standard tractor wheel, as illustrated in Fig. 3. The purpose of this narrow outer wheel is not only to make such outer unit of light weight and easily positioned upon the tractor wheel, but also to make it possible to vary the gauge or width of the threads of the tractor. It will be obvious from inspection of Fig. 3 that the outer unit may be positioned at various points relative to the inner and outer edges of the tractor wheel and that by varying the outer units on either or both of the tractor wheels that the gauge or point of contact of the tractor with the ground may be varied. This is very desirable in cultivating different kinds of crops at different stages of their growth and upon grounds having varying topography.

It will be understood that while we have provided a novel and compact outer unit structure made up of two or more unit segments which are preferably designed to be secured to the tractor wheel without the necessity of raising the same, that if desired, this outer wheel made up of the arcuate unit segments may be bolted together and applied to the tractor wheel, after the same has been lifted. Any of the forms shown in the drawings may be so applied to the tractor wheels as a unit if desired, and any of such forms may be clamped rigidly to the tractor wheels by either tightening the bolts connecting the adjacent segmental units or by securing the segmental units, by means of bolts, directly to the tractor wheel rims.

What we claim is:

1. A device for attachment to tractor wheels to increase the diameter thereof, comprising a plurality of rim segments, means connecting each segment with the next adjacent segment, one end of at least one segment being angularly disposed with respect to the wheel radius, whereby such segment can be used in initially raising the tractor wheel.

2. A device for attachment to tractor wheels to increase the diameter thereof, comprising a plurality of rim segments, means connecting each segment with the next adjacent segment, one end of at least one segment being angularly disposed with respect to the wheel radius, whereby such segment can be used in initially raising the tractor wheel, and means connecting this said segment to the wheel.

3. A device for attachment to tractor wheels to increase the diameter thereof, comprising a plurality of rim segments, each consisting of inner and outer segment portions connected by end members, means connecting each segment with the next adjacent segment, one end member of one segment being angularly disposed with respect to the wheel radius, whereby the same can be used in initially raising the tractor wheel, and one end of the adjacent segment being oppositely angularly disposed so as to fit in over-lapping relation with the first mentioned segment.

4. A device for attachment to tractor wheels to increase the diameter thereof, comprising a plurality of rim segments, means detachably connecting each segment to the tractor wheel, means connecting each segment to the next adjacent segment, each segment consisting of inner and outer segment portions for engagement with the tractor wheel and ground respectively, the ends of each segment being angularly disposed with respect to the wheel radius with the adjacent segments fitting in over-lapping relation and the said ends being integral with the said segment portions.

5. A device for attachment to tractor wheels to increase the diameter thereof, comprising a plurality of rim segments, each consisting of inner and outer segment portions connected by end members, means detachably connecting each segment to the tractor wheel, means connecting each segment to the next adjacent segment, the end members of each segment being angularly disposed with respect to the wheel radius with the adjacent segments fitting in overlapping relation, whereby any one of the segments can be used in initially raising the tractor wheel to which the device is connected.

6. A device for attachment to tractor wheels to increase the diameter thereof, comprising a plurality of rim segments, each segment consisting of an inner and an outer segment portion, end members connecting the inner and outer segment portions, the inner segment portion being adapted to fit against the tractor wheel for a portion of its length, said inner segment portion extending outwardly from the wheel and making contact with the outer segment portion to support the same, and means connecting each segment to the next adjacent segment and means connecting at least one of the segments to the tractor wheel.

In testimony whereof we have affixed our signatures.

DEAN EMERSON.
JAMES M. KEITH.